United States Patent Office 3,178,254
Patented Apr. 13, 1965

3,178,254
PROCESS FOR COLORING FIBROUS MATERIALS
Gerd Hoelzle, Liestal, Paul Ulrich and Heinz Peter Schaub, Basel, and Hans Heinrich Bosshard, Binningen, Switzerland, assignors to Ciba Limited, Basel, Switzerland, a company of Switzerland
No Drawing. Filed Dec. 4, 1962, Ser. No. 242,075
Claims priority, application Switzerland, Dec. 8, 1961, 14,263/61
14 Claims. (Cl. 8—54.2)

The present invention provides a process for coloring fibrous materials with a reactive compound suitable for coloring purposes which process comprises using as an agent that promotes reaction between the reactive component and the substratum a quaternary nitrogen compound not having the character of a dyestuff.

The nitrogen compounds correspond to the formula (1) $$R-\left[-R'^{\oplus}\right] \text{anion}^{\ominus}$$

in which R represents the radical of a heterocyclic compound whose hetero ring contains at least one nitrogen atom and is linked through one of its carbon atoms to R', and R' represents the radical of a tertiary non-aromatic nitrogen compound containing a quaternated nitrogen atom linked with R.

The compounds of the Formula 1 possess no dyestuff character and must, therefore, neither be capable of absorption as colors on substrates nor may they have a genuine, distinct color of their own. They consist of the radical R, the radical R' and the anion. The anion may be linked only through an electrovalent bond with $R'^{\oplus}$, as in the case of the formula (2) $$R-\left[-R'^{\oplus}\right] Cl^{\ominus}$$

or, as the sulfonate ion in the formula (3) $$R-\underset{SO_2O^{\ominus}}{\left[-R'^{\oplus}\right]}$$

such an anion may be linked, on one hand, through an electrovalent bond with $R'^{\oplus}$ and, on the other hand, through a covalent bond with R.

R is the radical of a heterocyclic compound whose hetero ring contains at least one nitrogen atom and which is linked through one of its cyclic carbon atoms to R'. R may represent, for example, a chloropyrimidine radical, for instance one of the formula (4) 

or a radical of a condensed chloropyrimidine compound, for instance one of the formula (4a) 

or a trichloropyridazine radical of a 4:6-diamino-1:3:5-triazine bound in position 2 to R'. Such a triazine radical corresponds preferably to the formula (5) 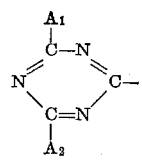

in which $A_1$ and $A_2$ each represents an $H_2N$, hydroxyl or alkoxy group or a radical of an aliphatic or aromatic amine, and $A_1$ and $A_2$ may be identical or different from each other. In such a case radicals containing sulfonate groups correspond to the formula (6) 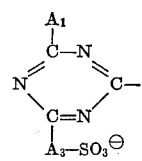

in which $A_1$ represents an $H_2N$ group or the radical of an aliphatic or aromatic amine bound through the nitrogen atom to the triazine ring, and $A_3$ likewise represents the radical of such an amine. $A_1$ may be, for example, the radical of a monoalkylamine or dialkylamine, of a hydroxyalkylamine, of a possibly further substituted aminobenzene or aminonaphthalene, and $A_3$ may be the radical of an aliphatic aminosulfonic acid, such as taurine. Alternatively, $A_3$ may represent the radical of an aminobenzene-monosulfonic or -disulfonic acid, as is the case with compounds of the formula (7) 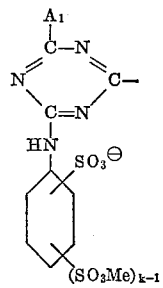

in which $k$ is 1 or 2, Me represents a cation, and $A_1$ has the meaning defined above. In the above Formulae 5 to 7 $A_1$ may also represent an OMe or O-alkyl group.

The radical R and the anion in the quaternary nitrogen compounds of the Formula 1 advantageously take the form of the grouping (8) 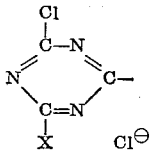

in which X stands for a chlorine atom or a hydroxyl group, or that of the grouping (9) 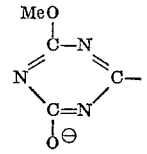

in which Me is a cation, such as sodium or potassium.

The radical R' in the quaternary nitrogen compounds of the Formula 1 is the radical of a tertiary non-aromatic nitrogen compound of, for example, aliphatic, cycloaliphatic or heterocyclic nature, and the radical R' contains a quaternary nitrogen atom linked with R.

Thus, the quaternary nitrogen compounds may belong to the group of the tertiary amines or of the tertiary hydrazines.

The tertiary amines may belong to the aliphatic or heterocyclic series and correspond, for example, to the formula

(10) 

or

(11) 

in which $R_1$ and $R_2$ each represents an aliphatic radical with 1 to 4 carbon atoms, for example an alkyl, hydroxyalkyl or alkoxyalkyl radical; $R_3$ represents an aliphatic radical with 1 to 10 carbon atoms, for example an alkylene or alkenylene group; $X_1$ represents a hydrogen atom, or a possibly substituted hydroxyl group, or the group

or the group

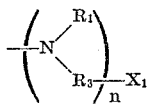

(in which $n=1$, 2, 3 or 4) or a possibly substituted aryl group; $R_4$, $R_5$ and $R_6$ each represents an aliphatic radical with 1 to 4 carbon atoms (for example an alkylene group) and $Y_1$ stands for a nitrogen atom or a CH group. In addition to one or more than one tertiary amino group the amines may contain substituents which, however, must not be capable of reacting with the reactive dyestuffs under the conditions to be used in the performance of the present process. As such substituents there come into consideration halogen atoms and nitro, alkoxy or hydroxyl groups. However, preferred use is made of amines that contain in addition to at least one tertiary amine nitrogen atom only carbon and hydrogen atoms.

Suitable aliphatic amines of the Formula 10 are, for example, those of the formula

(13) 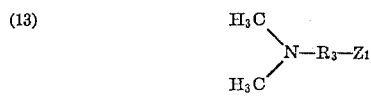

in which $R_3$ has the above meaning and $Z_1$ stands for a hydrogen atom or a hydroxyl group. Relevant examples are dimethyl allylmine, dimethyl-β-hydroxyethylamine and dimethyl-β-ethoxyethylamine. Valuable results are also obtained with aliphatic amines of the formula

(13) 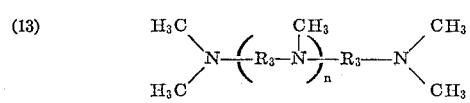

in which $R_3$ has the above meaning and $n=1$, 2, 3 or 4. To these compounds belong the polyalkylene-polyamines, for example pentamethyl-diethylenetriamine or hexamethyl-triethylenetetramine. Good results have also been achieved with aliphatic amines of the formula

(14) 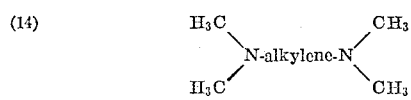

in which the alkylene radical contains 1 to 10 carbon atoms, being, for example, 1:2-bis-dimethylaminoethane, 1:4-bis-dimethylaminobutane or 1:6-bis-dimethylaminohexane. Particularly valuable representatives of the aliphatic amines are those which correspond to the formula

(15) 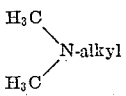

in which the alkyl radical contains 1 to 4 carbon atoms. Such compounds are, for example, dimethyl ethylamine, dimethyl propylamine, dimethyl isopropylamine and more especially trimethylamine.

As a rule these aliphatic amines should contain no more than 6 carbon atoms for every tertiary amino group.

Suitable heterocyclic amines of the Formula 4 are those tertiary amines in which the nitrogen atom, or the two nitrogen atoms respectively, belongs or belong at the same time to several rings so that the nitrogen atom of the tertiary amino group (or amino groups) forms a bridge member between several rings. These rings may contain substituents such as halogen atoms, nitro groups, hydroxyl groups, keto groups or alkoxy groups, and they may also be condensed with other rings or ring systems which themselves may also contain substituents. Preferred use is made of heterocyclic amines that contain apart from the tertiary amino group(s) only carbon and hydrogen atoms. It has proved likewise advantageous when no more than 8 carbon atoms for every tertiary amino group are present. Suitable representatives of this group are, for example, amines of the formula

(16) 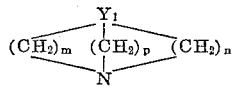

in which $Y_1$ has the above meaning, and $m$, $n$ and $p$ each is a whole number from 1 to 4. As relevant examples there may be mentioned, inter alia, pyrrolizidine, 1-azabicyclo-(2:2:1)heptane, quinuclidine, quinuclidone, 1-aza-bicyclo(3:2:1)octane, 1-aza-bicyclo(3:2:2)-nonane and more especially 1:4-diaza-bicyclo(2:2:2)octane (also called triethylene diamine).

The last-mentioned compound corresponds to the formula

(17) 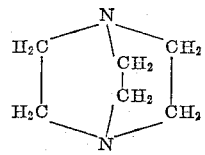

which, written in a simplified manner, takes this form:

(18) 

When the quaternary nitrogen compounds of the Formula 1 belong to the hydrazine series, they must contain at least one tertiary nitrogen atom, that is to say that one of the two nitrogen atoms of such a hydrazine grouping must be bound as a tertiary nitrogen atom to the two carbon atoms; the other nitrogen atom may be substituted or unsubstituted. There are further suitable cyclic hydrazines, more especially those in which one of the two hydrazine nitrogen atoms or both is/are members of one or more than one ring.

In general, it is of advantage to use hydrazines that are soluble in the dyebath or in the printing paste. Apart from one or more than one hydrazino group they may contain substituents that do not react with the reactive dyestuffs, for example halogen atoms or nitro, alkoxy or hydroxyl groups. Preferred use is made, however, of hydrazines that contain apart from at least one =N—N= group only carbon and hydrogen atoms, for example hydrazines that contain at least 1 tertiary nitrogen atom and are substituted only by non-aromatic hydrocarbon radicals.

Such hydrazines may correspond, for example, to the formula

(19) 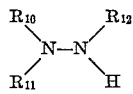

in which $R_{10}$ and $R_{11}$ each represents an aliphatic hydrocarbon radical with up to 4 carbon atoms, and $R_{12}$ likewise represents such a radical, or an HS—CS, or an $HO_3S$ group, or a

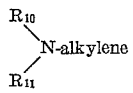

group or preferably a hydrogen atom, and $R_{10}$ and $R_{11}$ together with one nitrogen atom may also form a preferably 5-membered or 6-membered ring.

The purely aliphatic hydrazines of the Formula 19 correspond with advantage to the formula

(20) 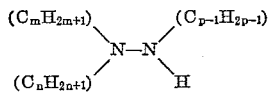

in which $m$ and $n$ each represents a whole number from 1 to 4, preferably 1, and $p$ is a while number from 1 to 5. The aliphatic hydrocarbon radicals in these hydrazine compounds may be branched, but they are preferably unbranched.

Finally, there may be specifically mentioned those hydrazines in which the vicinal nitrogen atoms form at the same time members of two condensed rings, for example those of the formula

(21) 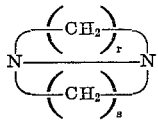

in which $r$ and $s$ may be identical or different and represent 3 or 4.

As specific examples there may be mentioned the following hydrazines:

N:N-dimethylhydrazine,
N:N:N'-triethylhydrazine,
N-aminopiperidine of the formula

(22) 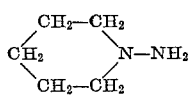

1:5-diaza-bicyclo(0:3:3)octane of the formula

(23) 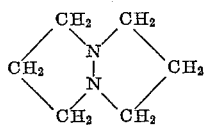

or

(24) 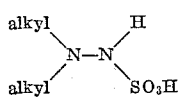

more especially of the formula

(25) 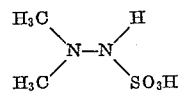

or

(26) 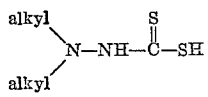

such as

(27) 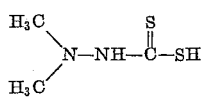

The quaternary nitrogen compounds of the Formula 1 are accessible by reaction of non-aromatic tertiary nitrogen compounds with compounds of the Formula R-halogen, in which R represents the radical of a heterocyclic compound whose heterocycle contains at least one nitrogen atom and is linked to the halogen atom through one of its carbon atoms. The relevant quaternation may take the course of an additive reaction when the tertiary nitrogen compound is reacted with a heterocyclic compound that contains at least one mobile halogen but is free from acidic substituents capable of forming anions, such as carboxylic acid or sulfonic acid groups. When, on the other hand, a tertiary nitrogen compound is reacted with a compound of the formula

(28) 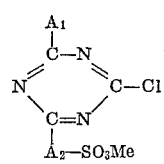

(in which $A_1$ represents $H_2N$ group or the radical of an aliphatic or aromatic amine, $A_2$ represents the radical of an aromatic amine, and Me stands for a cation, preferably an alkali metal ion), MeCl is eliminated and there is obtained a quaternary nitrogen atom of the formula

(29) 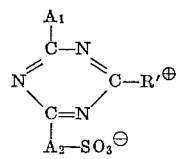

in which $A_1$, $A_2$ and $R'$ have the above meanings.

The quaternary compounds of the Formula 1 which have no dyestuff character are used as auxiliaries for coloring, i.e., dyeing or printing fibrous materials with a reactive compound suitable for coloring purposes, i.e., reactive dyestuffs or reactive dyestuff intermediates, and promote the reaction of the dyestuff with the substratum.

As is known the term "reactive dyestuff" is applied to dyestuffs that form during the dyeing or printing process a covalent bond with the material to be dyed or printed, and as a rule this is accompanied by elimination of the reactive substituent of the dyestuff. The speed at which the bond between dyestuff and substratum is formed depends on one hand on the dyeing conditions (such as temperature, pH-value of the dyebath or printing paste) and on the other hand on the reactivity of the reactive grouping of the dyestuff. It is known that in this respect there are considerable differences between the individual reactive dyestuffs. With the aid of the quaternary nitrogen compounds of the Formula 1 it is now possible to increase considerably the reactivity of these dyestuffs.

It is of advantage to use in the present process watersoluble reactive dyestuffs, for example organic dyestuffs from diazo or coupling components that contain carboxyl groups, sulfonic acid groups or aliphatically bound sulfuric acid ester groups. As relevant reactive groupings there may be mentioned the epoxide groups, ethyleneimino groups, isocyanate, isothiocyanate or carbamic acid aryl ester groups, the propiolic acid amide grouping, mono- and dichlorocrotonylamino groups, chloracrylamino groups, vinylsulfone groups and more especially the groupings that contain a labile substituent and are easy to eliminate with entrainment of the bond electron pair, for example sulfonyl halide groups, aliphatically bound sulfuric acid ester groups and aliphatically bound sulfonyloxy groups and halogen atoms, more especially an aliphatically bound chlorine atom. Advantageously, these labile substituents are in position γ or β of an aliphatic radical which is bound to the dyestuff molecule either directly or through an amino, sulfone or sulfonamide group. In the case of those relevant dyestuffs which contain as labile substituents halogen atoms these labile halogen atoms may also be present in an aliphatic acyl radical, for example in an acetyl radical, or in position β or positions α and β of a propionyl radical or preferably in a heterocyclic radical, for example in a pyrimidine or pyridazine ring, above all in a triazine ring. The dyestuffs contain advantageously a grouping of the formula (30)

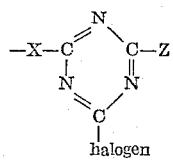

or (31)

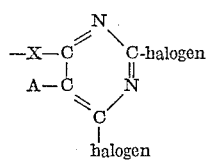

in which X stands for a nitrogen bridge and Z for a hydrogen atom, or for a possibly substituted amino group, for an etherified hydroxyl or mercapto group, for a halogen atom or for an alkyl, aryl or aralkyl group, and A represents a hydrogen or halogen atom. The halogen atoms may be, for example, bromine atoms, but they are advantageously chlorine atoms.

Especially valuable results are obtained with dyestuffs containing the grouping of the formula (32)

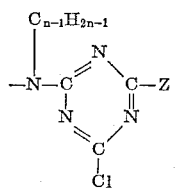

in which $n=1$, 2, 3 or 4, and Z has the above meaning.

Alternatively, there may be used dyestuffs containing diphenoxytriazine groupings and those which contain a group of the formula (33)

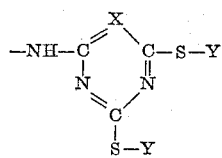

in which X stands for =CH—,

or =N— and Y represents a group of the formula

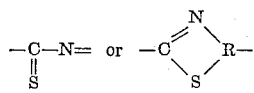

in which R represents an ortho-arylene radical.

Further suitable reactive groupings are the following radicals: trichloropyridazine, dichloroquinoxaline, dichlorobutene, halogenated pyridazone, sulfonyldichloropropylamide, allylsulfone, allylsulphide, 2-halobenzthiazole carbamide, isothiocyanate and β-sulfato-propionic acid amide.

The present process may be performed with a wide variety of organic dyestuffs, for example oxazine, tri- phenylmethane, xanthene, nitro, acridone, azo, anthraquinone and phthalocyanine dyestuffs.

From the azo dyestuff series there may be mentioned, for example, disazo and trisazo dyestuffs and more especially monoazo dyestuffs. A large number of such reactive azo dyestuffs is already known so that there is no need to deal with them in greater detail in this connection.

From the series of the anthraquinone dyestuffs there may be especially mentioned 1-amino-4-bromanthraquinone-2-sulfonic acid and the dyestuffs derived from 1:4-diaminoanthraquinone-2-sulfonic acid. These and other anthraquinone dyestuffs are manufactured by known methods. As suitable phthalocyanine dyestuffs there may be mentioned more especially dyestuffs derived from nickel or copper phthalocyanine sulfonamides whose molecule generally contains at least two free sulfonic acid groups and which contain in at least one sulfonamide radical a group comprising at least one labile halogen atom. Further suitable are phthalocyanines that contain as solubilizing and at the same time reactive substituents eliphatically bound acid sulfuric acid ester groups, for example those of the formula

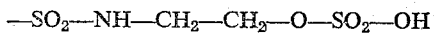

or

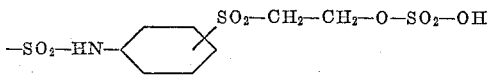

and may contain as further solubilizing groups also sulfonic acid groups. Such dyestuffs are manufactured in known manner.

The present process may also be performed with vat dyestuffs that are soluble or insoluble in water in their oxidized form or with disperse dyestuffs having the character of reactive dyestuffs.

There are several advantageous ways of performing the present process: Inter alia, different proportions may be used, for example for every reactive group of 1 molecular proportion of dyestuff at least 1 molecular proportion of quaternary nitrogen compound or for the same amount of dyestuff less than 1 molecular proportion of the quaternary nitrogen compound. With either of these two ratios the following two different methods may be used:

(a) The fibrous material is dyed or printed with a preparation manufactured from reactive dyestuffs and quaternary nitrogen compounds;

(b) the reactive dyestuff and the quaternary nitrogen compound are applied to the fibrous material in two separate operations.

Variant (a) is not only suitable for a stoichiometric proportion of the quaternary nitrogen compound but also with special advantage for a ratio in which for every reactive group of 1 molecular proportion of dyestuff less than 1 molecular proportion of the quaternary compound of the Formula 1 is used. It is especially suitable for a "catalytic proportion of the quaternary nitrogen compound" which, as is usual, means one which is substantially below the stoichiometric proportion referred to above. The amount of quaternary compound referred to the reactive dyestuff may vary within certain limits. Referred to the weight of dyestuff there may be used as catalytic proportion about 0.1 to 10% by weight and preferably about 0.2 to 2% by weight of the quarternary compound.

According to variant (b)—where the quaternary compound may likewise be used in a stoichiometric or catalytic proportion—the reactive dyestuff and the quaternary compound are applied in either order of succession to the fibrous material, if desired with an intermediate drying being performed.

In other respects it is immaterial whether and to what extent the reaction between the reactive dyestuff and the quaternary nitrogen compounds by any one of the variants of the process and with any one of the possible ratios is accompanied by reactions, such as splitting of the quaternary compound of the Formula 1 and the formation of quaternary nitrogen compounds of the reactive dyestuffs.

What has been said above with reference to the reactive dyestuffs applies appropriately also to the reactive dyestuff intermediates, for example reactive coupling components.

The present process is suitable for dyeing or printing a wide variety of fibrous materials such as paper or leather and above all textile materials, for example those made from animal fibers, such as silk, and above all those from cellulose fibers, including both native cellulose fibers such as linen or cotton and those from regenerated cellulose such as rayon (viscose) or spun rayon. In other respects the dyeing and printing operations are performed under the conditions usually applied to working with reactive dyestuffs, more especially when a catalytic proportion of the quaternary compound is used. For dyeing and printing cellulosic textile materials it is of advantage to use concomitantly an inorganic acid acceptor, such as a carbonate, hydroxide, bicarbonate or phosphate of an alkali metal or mixtures thereof, or bases such as trimethylbenzyl ammonium hydroxide or sodium trichloracetate. When reactive vat dyestuffs are used, there may also be used the usual reducing agents such as sodium hydrosulfite, thiourea dioxide, sodium sulfide or sodium sulfoxylate. When quaternary compounds of the Formula 1 are used, on the other hand, it is possible to fix reactive vat dyestuffs on the fiber even in the absence of such reducing agents.

There may further be incorporated with the dye-baths or printing pastes the usual additives such as electrolytes, for example sodium chloride or acetate, or non-electrolytes such as urea, or thickeners such as alginates. To prevent any undesirable reduction taking place, more especially in the case of delicate dyestuffs, one of the conventional additives, such as meta-nitrobenzenesulfonic acid, may be added. As a rule the quaternary compound is added to the dyebath or the printing paste. When dyeing is performed in two stages—the application of the dyestuff to the substratum and its fixation on it by means of the acid acceptor being performed as two separate operations—it is possible to delay the addition of the quaternary compound until the second stage of the process is reached.

As mentioned above, the dyeing and printing of the fibrous material is performed under the conditions generally used for reactive dyestuffs. The present process makes it possible to reduce the reaction time and/or the reaction temperature and/or to produce dyeings and prints of superior tinctorial strength, thus, for example, by the cold pad batch method, by the exhaustion method, by the pad steam or pad dry method, by the pad wet steam method and in printing. Depending on the method used the dyestuffs can be fixed at different temperatures, ranging for example from 20 to 200° C. or higher, for example between 250 and 300° C.

Unless otherwise indicated, parts and percentages in the following examples are by weight. As a rule, the dyestuffs are shown in the form of their free acids but they are actually used in the form of their alkali metal salts.

Example 1

16.2 parts (0.05 mol) of the compound of the formula (101a)
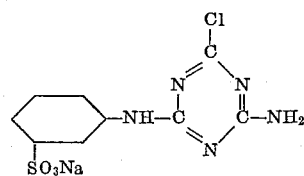

(obtained in known manner by stepwise condensation of equimolecular proportions of the sodium salt of 1-aminobenzene-2-sulfonic acid with 2:4:6-trichloro-1:3:5-triazine in an aqueous medium at 0 to 3° C., followed by condensation with ammonia at 40 to 45° C.) are dissolved in 500 parts of water. There is then added a solution of 5.6 parts (0.05 mol) of 1:4-diaza-bicyclo(2:2:2)octane in 50 parts of water. When the mixture is kept for a short time at 20° C., the quaternation product begins to precipitate in the form of colorless crystals. After 5 to 20 hours the precipitate is filtered off, washed with water until the washings contain no halogen and then dried under vacuum at 50° C., to yield the product of the formula (101b)
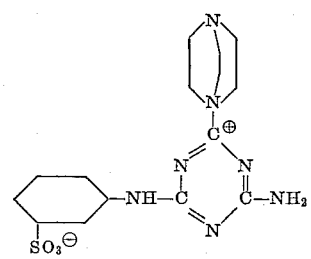

in a very good yield and substantially analytically pure.

In an analogous manner the following products can be prepared:

(102)
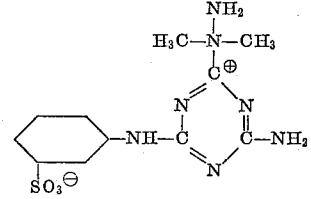

(103)
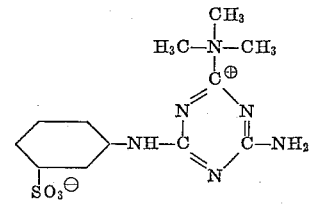

(104)
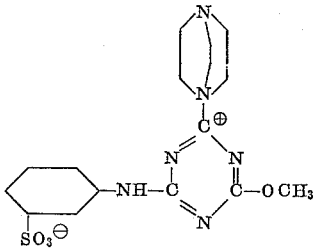

(104a)
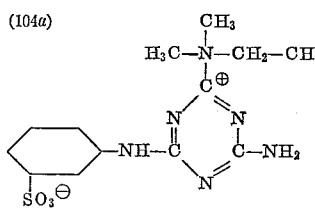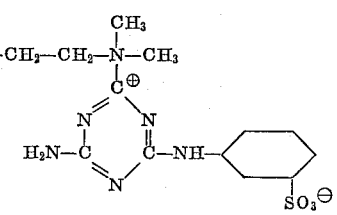

(101b) 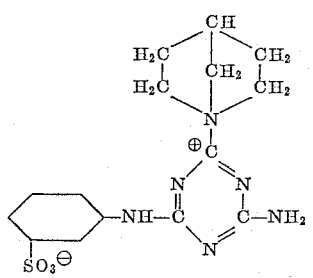

(104c) 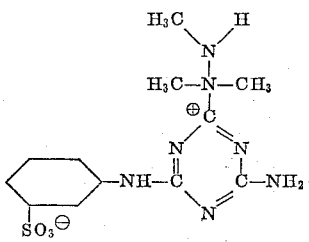

(104d) 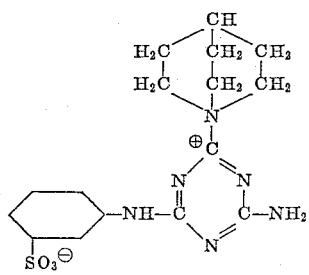

(104e) 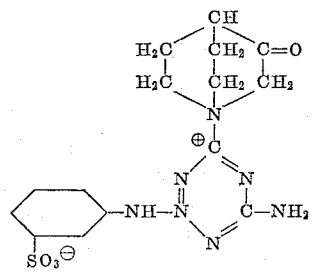

*Example 2*

42.6 parts (0.1 mol) of the compound of the formula (105a) 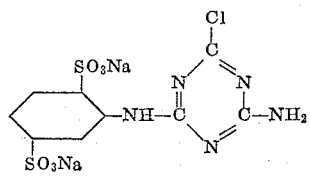

are dissolved in 500 parts of water and there is then added a solution of 11.2 parts (0.1 mol) of 1:4-diazabicyclo-(2:2:2)octane in 50 parts of water. The reaction solution is kept for several hours at 20 to 25° C. The quaternation product of the formula (105b) 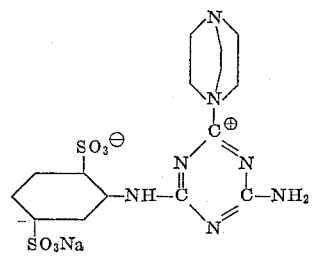

is salted out with sodium chloride, filtered off, washed with concentrated sodium chloride solution and finally dried under vacuum at 50° C.

In analogous manner the following compounds are obtained by reacting the corresponding monochlorotriazine compounds with tertiary amines or N:N-dimethylhydrazine:

(106) 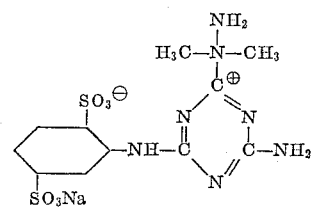

(107) 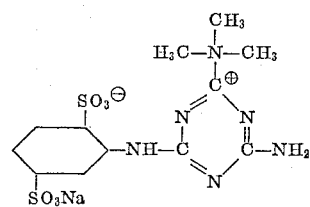

(108) 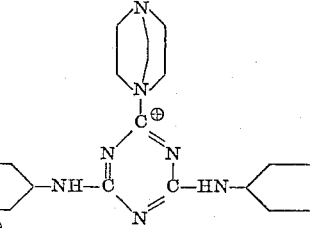

(109) 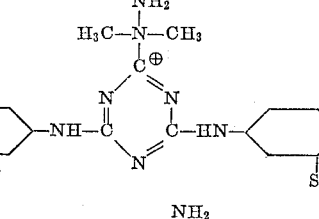

(110) 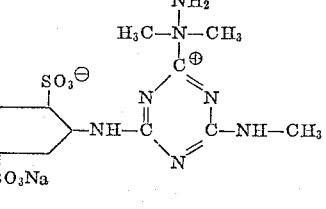

(111) 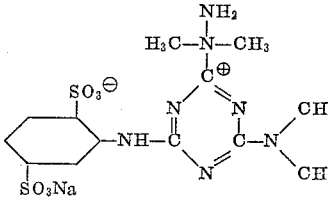

(112) 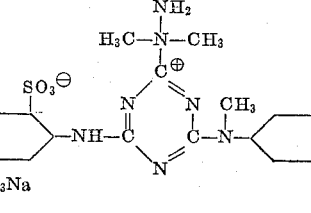

(113) 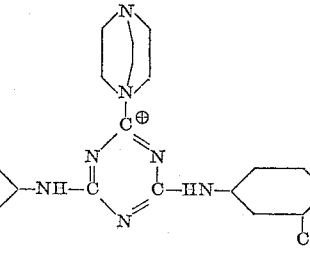

(114) 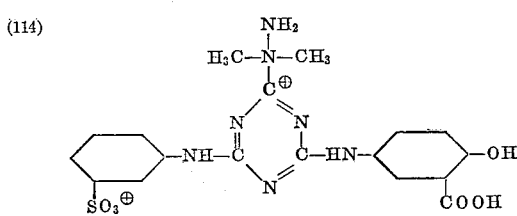

(115) 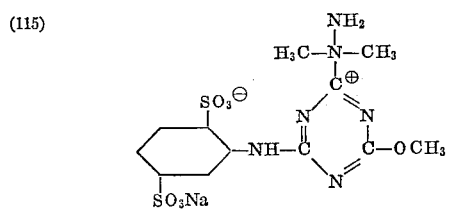

(116) 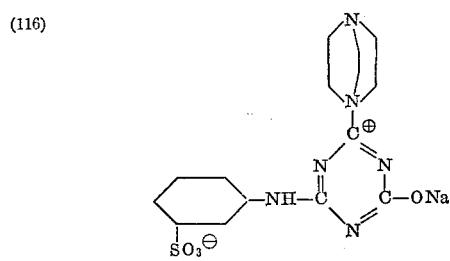

(117) 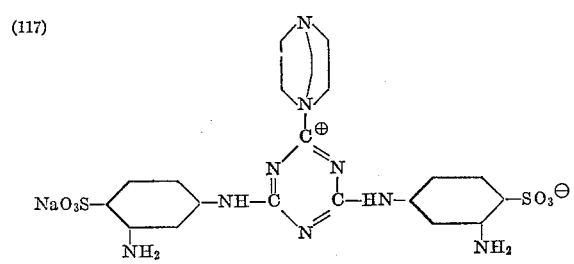

(118) 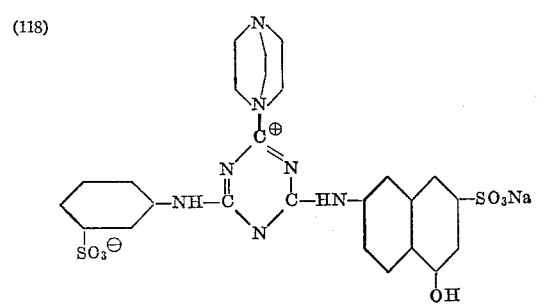

(119) 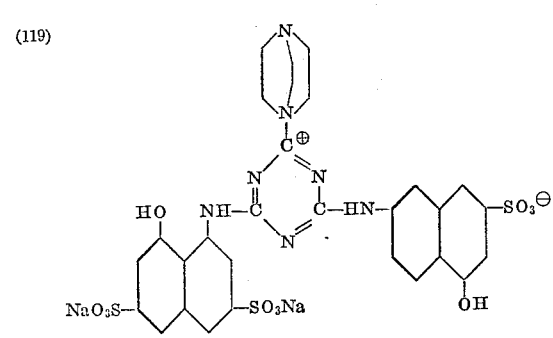

(120) 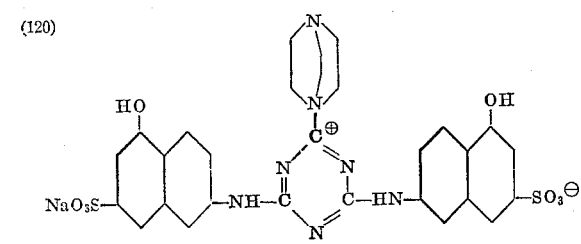

(121) 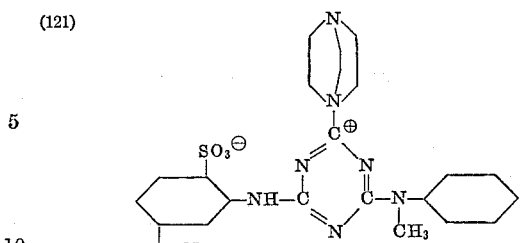

(122) 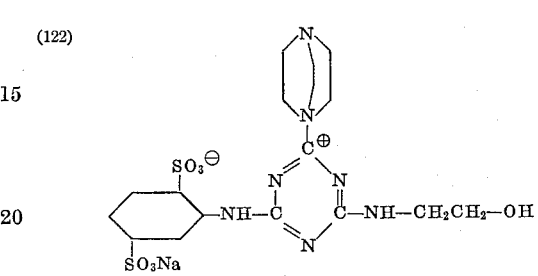

(123) 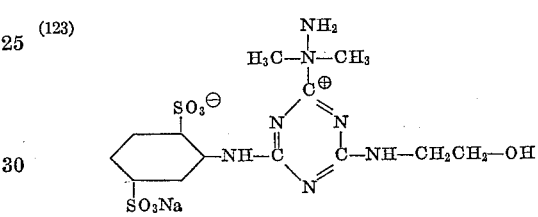

(124) 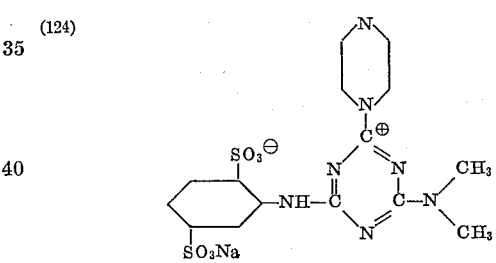

*Example 3*

20.2 parts (0.1 mol) of the compound of the formula (125a) 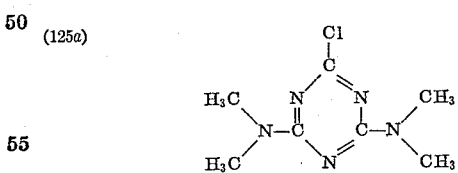

are dissolved in 300 parts of acetone and while stirring vigorously a solution of 6 parts (0.1 mol) of N:N-dimethyl-hydrazine in 50 parts of acetone is slowly run in. The quaternation product of the formula (125b) 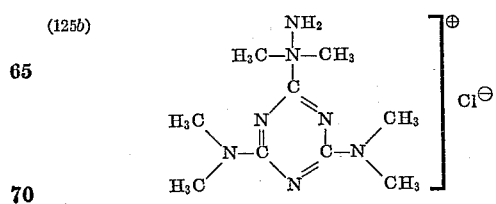

precipitates immediately. It is filtered off, washed with a small amount of acetone and dried under vacuum at 20 to 30° C. Acetone may be replaced with advantage by other solvents, for example chlorobenzene or dioxane.

In an analogous manner the following compounds are obtained:

(126)
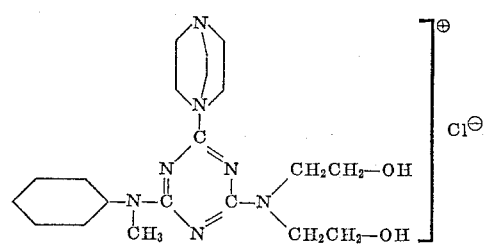

(127)
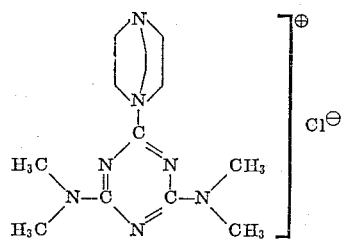

(127a)
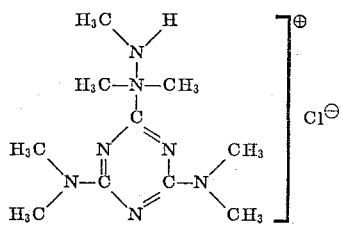

(127b)
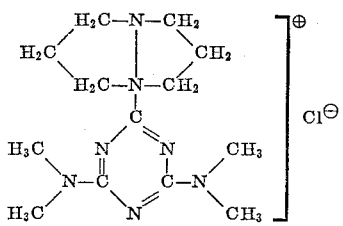

*Example 4*

A solution of 14.6 parts (0.1 mol) of the compound of the formula (127c)
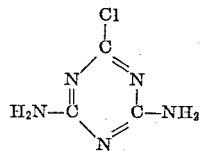

in 600 parts by volume of dimethyl formamide is mixed with 6 parts (0.1 mol) of N:N-dimethylhydrazine. After some time the quaternation product of the formula (127d)
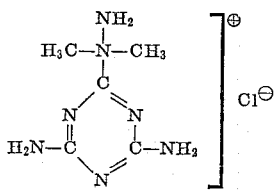

precipitates in the form of colorless crystals which are filtered off after 5 hours, washed with dimethyl formamide and dioxane and then dried.

In an analogous manner the following compounds are obtained:

(127e)
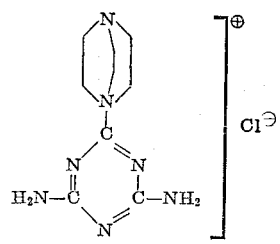

(127f)
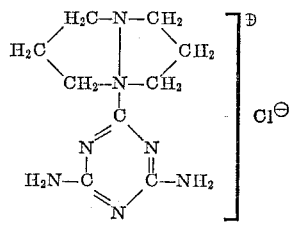

*Example 5*

In the course of 15 minutes 6 parts of N:N-dimethylhydrazine are stirred dropwise at 0 to 3° C. into a neutral solution of 16.6 parts (0.1 mol) of 2-hydroxy-4:6-dichloro-1:3:5-triazine in 300 parts of water. The reaction product of the probable formula (128)
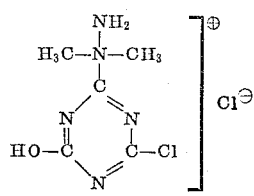

cannot be salted out with sodium chloride. The reaction solution is therefore evaporated to dryness under vacuum.

*Example 6*

A solution of 17 parts (0.1 mol) of the compound of the formula (129a)
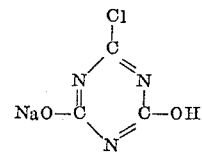

in 300 parts of water is mixed with a solution of 6 parts (0.1 mol) of N:N-dimethylhydrazine in 50 parts of water. The reaction solution is kept for 20 hours at 20 to 25° C. The quaternation product of the formula (129b)
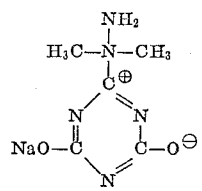

is salted out with sodium chloride, filtered off, washed with sodium chloride solution and dried under vacuum at 50° C.

*Example 7*

While being thoroughly stirred, a solution of 11 parts (0.05 mol) of tetrachloropyrimidine in 300 parts of acetone is mixed with a solution of 5.6 parts (0.05 mol) of 1:4-diaza-bicyclo(2:2:2)octane in 50 parts of acetone.

The quaternary salt of the probable formula (130)
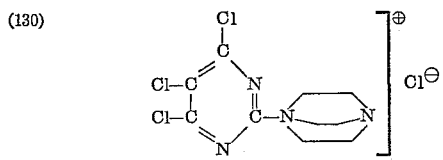

precipitates spontaneously; after 30 minutes it is filtered off, washed with 200 parts of acetone and dried under vacuum.

In an analogous manner there may be prepared the compound of the formula (131)
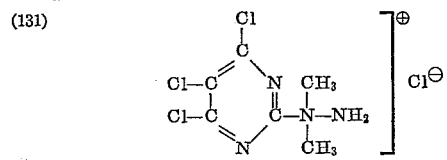

Example 8

A solution of 5 parts (0.025 mol) of 2:4-dichloroquinazoline in 100 parts by volume of dimethyl formamide is mixed with 2.8 parts (0.025 mol) of 1:4-diaza-bicyclo(2:2:2)octane in 25 parts by volume of dimethyl formamide. After 24 hours the crystalline product of the the probable formula (132)
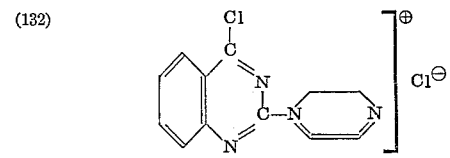

is filtered off, washed with a small amount of dimethyl formamide and then with acetone and finally dried under vacuum at 40° C.

Example 9

A solution of 5.6 parts (0.05 mol) of 1:4-diazabicyclo(2:2:2)octane in 100 parts by volume of acetone is vigorously stirred into a solution of 9.2 parts (0.05 mol) of 3:4:5-trichloropyridazine in 100 parts by volume of acetone. The precipitated product of the probable formula (133)
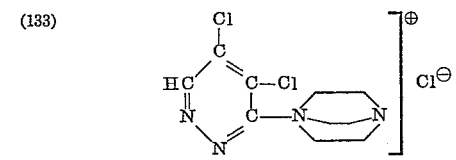

is immediately filtered off, washed with acetone and dried under vacuum at 40° C.

Example 10

40 parts of the dyestuff of the formula (201)
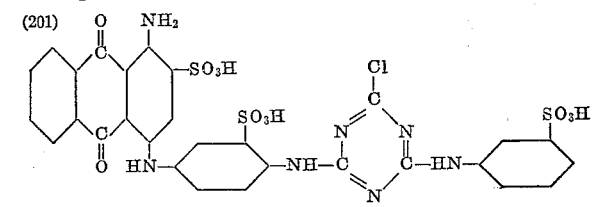

are dissolved in 700 parts of boiling water, the solution is then cooled to 20° C. and mixed with 10 parts by volume of sodium hydroxide solution of 30% strength, 20 parts of crystalline sodium sulfate and 0.2 to 2 parts of the compound of the Formula 105b. The resulting solution is made up with cold water to a volume of 1000 parts.

A cotton fabric is padded with the above solution to a weight increase of 75%, immediately reeled and in the reeled state kept for 6 to 12 hours at 20° C. After this storing the unfixed portion of the dyestuff is removed by thorough rinsing in cold and then in boiling water, and the dyeing is finally soaped in the usual manner.

The resulting blue tint has good fastness to light and washing and is of a substantially greater tinctorial strength than a comparable dyeing produced without adding the quaternary compound.

When the 10 parts by volume of sodium hydroxide are replaced by 15 parts of trisodium phosphate, good results are likewise achieved.

Similar results are obtained when the above compound of the Formula 105b is replaced by one of the compounds of the Formulae 104a to 104e, 106, 108, 111, 114, 120, 127a or 127b.

Example 11

A cotton fabric is padded at 50° C. with a solution containing per 1000 parts of water 30 parts of the dyestuff of the formula (202)
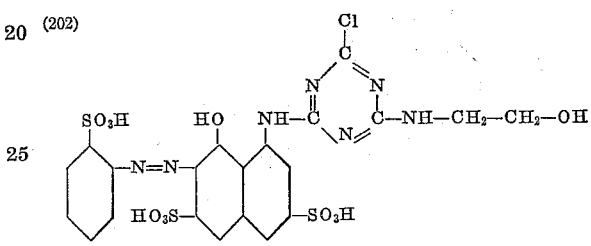

and then dried. The fabric is then padded with a solution containing per 1000 parts of water, 200 parts of calcined sodium sulfate, 10 parts by volume of sodium hydroxide solution of 30% strength and 0.2 to 5 parts of the compound of the Formula 105b. The fabric is reeled, stored in the reeled state for 3 to 6 hours at room temperature and then finished off as described in Example 10.

The resulting brilliant red dyeing is of a distinctly greater tinctorial strength than a comparable dyeing produced without adding the compound of the Formula 105b.

When the compound of the Formula 105b is replaced by one of the quaternary compounds of the Formulae 101b, 102, 103, 106, 115, 117, 121, 122, 124, 127d, 127e, 127f, 128, 129b, 132 or 133 the resulting dyeings likewise display greater tinctorial strength than when this additive is omitted.

Equally good results are obtained on fabrics from viscose rayon or spun rayon.

Example 12

A solution of 1.5 parts of the dyestuff of the formula (203)
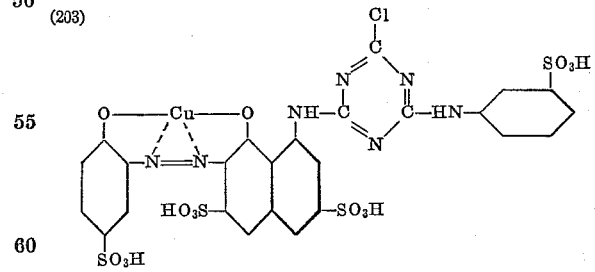

in 250 parts of boiling water is added to a solution containing per 750 parts of water 60 parts of sodium chloride. The dye liquor thus prepared is used to dye 50 parts of cotton yarn for 30 minutes at 40° C. The dyestuff absorbed by the fiber is fixed after the exhaustion process in the same dyebath in the presence of 15 parts of trisodium phosphate and 1 part of the compound of the Formula 105b. Fixing takes 1½ hours at 40° C. The dyed yarn is thoroughly rinsed in cold and in hot water and finally soaped at the boil.

The resulting brilliant violet dyeing possesses good properties of fastness and is of considerably greater tinctorial strength than a comparable dyeing produced without addition of the quaternary compound.

When the dyestuff used above is replaced by an equivalent proportion of the dyestuff of the formula (204)

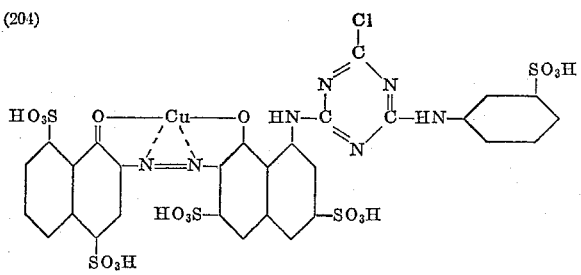

good results are likewise achieved.

Similar good results are obtained by using equal proportions of the quaternary compound of the Formula 106, 113 or 125b. Distinct effects are also obtained by using the dyestuff of the formula (205)

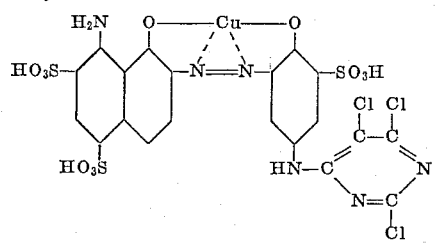

which is accessible by condensing the copper complex of the aminoazo dyestuff concerned with tetrachloropyrimidine in an aqueous medium at a pH value from 6 to 9.

Example 13

30 parts of the dyestuff of the Formula 202 mentioned in Example 11 are mixed with 50 parts of urea and dissolved in 700 parts of boiling water. The solution is cooled to 40° C. and mixed with 20 parts of sodium carbonate and 2 to 10 parts of the compound of the Formula 116, whereupon the solution is diluted with cold water to 1000 parts.

A cotton fabric is impregnated with the above solution on a padder to a weight increase of 75% and then directly (that is to say without intermediate drying) steamed for 1 minute, then rinsed and soaped in the usual manner.

The resulting brilliant red dyeing has very good fastness to light and washing. The identical procedure, without addition of the compound of the Formula 116, produces a substantially weaker tint.

Advantageous effects are also obtained when the dyed material, before the steam treatment, is stored in the wet, reeled state (with prevention of any partial drying) for 30 to 60 minutes.

Similar results are obtained by using one of the quaternary compounds of the Formulae 119, 123, 126 or 130.

Example 14

30 parts of the dyestuff of the formula (206)

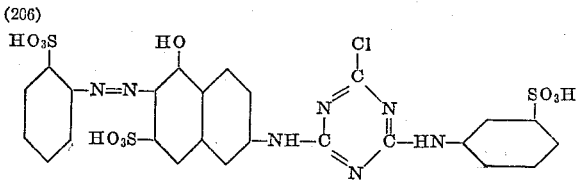

are mixed with 40 parts of urea and the mixture is dissolved in 600 parts of boiling water. The solution is cooled to 40° C., and 20 parts of sodium carbonate and 1.5 parts of the compound of the Formula 130 are added. The whole is diluted with cold water to 1000 parts.

A cotton fabric is padded with the above solution to a weight increase of 70%. The fabric is then reeled and stored for 1 hour in a pad roll installation at a temperature of 80° C. (wet bulb thermometer). The fabric is finally thoroughly rinsed in cold and in hot water and soaped at the boil.

The resulting intense orange dyeing possesses very good properties of fastness to light and washing and its tint is substantially stronger than a comparable dyeing produced in identical manner but without adding the quaternary compound.

Good results are also achieved by using the compound of the Formula 125b or 131 quaternated with dimethyl hydrazine.

Comparable results are obtained on linen fabrics.

Example 15

A solution of 3 parts of the dyestuff of the Formula 201 of Example 10 in 100 parts of water is used to impregnate a cotton fabric to a weight increase of 70%. The fabric is intermediately dried and then impregnated to a weight increase of 80% with another solution containing 250 parts of sodium chloride, 6 parts of sodium hydroxide (of 100% strength) and 10 parts of the compound of the Formula 106 in 900 parts of water. Immediately following this, the fabric is steamed for 30 seconds with steam heated at 103 to 110° C. and then finished off in known manner.

The resulting brilliant blue dyeing possesses very good properties of fastness to light and washing. The same procedure, but with omission of the compound of the Formula 106, furnishes a substantially weaker tint.

The compound of the Formula 106 may be replaced by the compound of the Formula 105b, 107 or 130.

Example 16

40 parts of the 1:2-chromium complex containing per atomic proportion of chromium two molecules of the dyestuff of the formula (207)

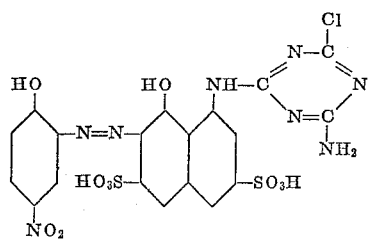

are mixed with 200 parts of urea and dissolved with heating in 870 parts of water; the solution is then cooled to room temperature and a solution of 20 parts of sodium carbonate and 10 parts of the compound of the Formula 108 are stirred in. A mercerised cotton fabric is impregnated with this solution to a weight increase of 70%, then dried in a current of hot air until the cotton displays a residual moisture content of 8%, then thoroughly rinsed in cold and in boiling water and dried.

The covered, greenish blue dyeing has very good properties of wet fastness.

When the compound of the Formula 108 is omitted but otherwise the identical procedure is used, a substantially lighter tint is obtained.

Example 17

A printing paste is prepared which contains 50 parts of the dyestuff of the Formula 202 of Example 11
200 parts of urea
375 parts of water
350 parts of sodium alginate thickening 50:1000
10 parts of sodium bicarbonate
5 parts of the compound of the Formula 105b
10 parts of sodium meta-nitrobenzenesulfonate A cotton fabric is printed with the printing paste on a roller printing machine, then dried and finally steamed for 3 minutes at 100° C. in a Mather-Platt ager. The fixed print is rinsed in cold and in hot water and dried.

The resulting red print has the identical tinctorial strength as a print fixed for 8 minutes in the absence of the compound of the Formula 105b.

When the dried prints are fixed for 10 seconds with infrared driers, similar good results are obtained.

A similar result is obtained on a spun rayon fabric.

The quaternary compounds of the Formulae 106, 107, 116 and 131, added in equivalent proportions, likewise produce a distinct intensification of the tinctorial effect.

(209)

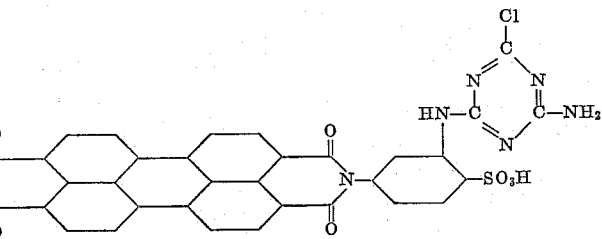

Example 18

A printing paste is prepared from:
50 parts of the dyestuff of the Formula 204 of Example 12
200 parts of urea
370 parts of water
350 parts of sodium alginate thickening 50:1000
10 parts of sodium bicarbonate
10 parts of the compound of the Formula 105b
10 parts of sodium meta-nitrobenzenesulfonate The above printing paste is applied on a roller printing machine to a cotton fabric which is dried and then fixed for 30 seconds in a rapid ager. Finishing off is performed as described in Example 10.

The resulting blue print has the same tinctorial strength as when the fabric is fixed for 8 minutes in the absence of the compound of the Formula 105b.

Comparable effects can also be produced with the compound of the Formula 108 or with a mixture of the compounds of the Formula 105b and 106.

Example 19

A printing paste is prepared which consists of:
50 parts of the dyestuff of the formula shown below
200 parts of urea
320 parts of water
350 parts of sodium alginate thickening 50:1000
60 parts of aqueous potassium carbonate solution of 30% strength
10 parts of the compound of the Formula 118
10 parts of sodium meta-nitrobenzenesulfonate A cotton fabric is printed with this printing paste on a roller printing machine, dried and then fixed for 30 seconds in a rapid ager, and finished off as described in Example 17.

The resulting turquoise print is of a substantially greater tinctorial strength than a comparable print fixed for 8 minutes in the absence of the compound of the Formula 118.

The compound of the Formula 118 may be replaced by an equivalent proportion of the compound of the Formula 105b, 106 or 131.

The dyestuff used in this example corresponds to the formula (208)

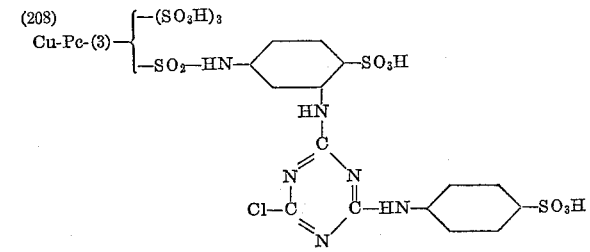

where Cu—Pc represents the copper phthalocyanine radical.

Example 20

A cellulose fabric is padded at 20 to 30° C. with a solution containing per 1000 parts of water 20 parts by volume of sodium hydroxide solution of 30% strength, 20 parts of the dyestuff of the formula and 8 parts of the compound of the Formula 105b or 106. The fabric is then reeled, wrapped in a plastic foil and stored for 12 hours, then rinsed, oxidized, soaped at the boil, once more rinsed and dried. The resulting vivid red dyeing is fast to washing at the boil.

An intense dyeing is obtained when the fixation is performed in the presence of sodium sulphide (20 parts per 1000 parts of padding liquor). In this case it is of advantage to follow up with an oxidative after-treatment.

Example 21

A solution of 0.6 part of the dyestuff of the Formula 202 used in Example 11 in 100 parts of hot water is added to a solution containing in 900 parts of water 50 parts of sodium chloride. 20 parts of natural silk are dyed in this dyebath for 30 minutes at a temperature of 40° C. The dyestuff which has been only substantively absorbed by the fiber is then fixed for 90 minutes at 40° C. with the addition of 2 parts of sodium carbonate and 0.5 part of the compound of the Formula 105b. The silk is then thoroughly rinsed in cold and in hot water and finally soaped at 70° C.

The resulting brilliant red dyeing is fast to light and washing and of a considerably greater tinctorial strength than a comparable dyeing obtained in the absence of the quaternary compound.

When the dyestuff used above is replaced by an equivalent proportion of the disazo dyestuff of the formula (210)

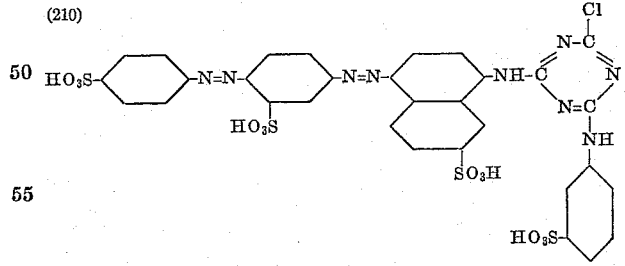

a yellowish brown tint is obtained.

Example 22

A solution of 40 parts of the coupling component of the formula (211)

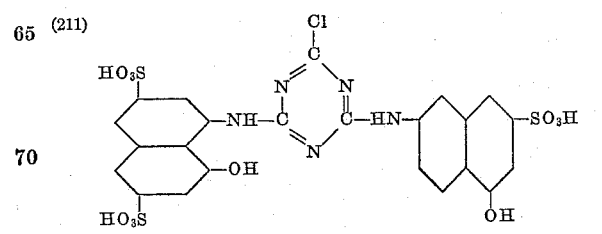

in 928.6 parts of water is mixed with 10 parts by volume of sodium hydroxide solution of 30% strength, 20 parts of crystalline sodium sulfate and 1.4 parts of the compound of the Formula 106.

A mercerized cotton fabric is padded with this solution, reeled and stored for 3 hours at a constant temperature of 30° C. After this storing the unfixed proportion of the dyestuff is washed out by a thorough rinse in cold and in hot water.

The cotton fabric impregnated in this manner is then developed with a freshly prepared solution containing per 1000 parts of water 2 parts of the diazo compound of metachloraniline. After coupling, the fabric is rinsed and soaped at the boil. The resulting brilliant scarlet dyeing is of good fastness to washing and rubbing.

A comparable dyeing produced without adding the above-mentioned quaternary compound is distinctly weaker.

When instead of meta-chloraniline there are used for the development 2 parts (per 1000 parts of water) of diazotized 1 - amino - 2 - methoxy-5-nitrobenzene, a deep claret tint is obtained which has good general fastness properties and is likewise substantially more intense than a comparable dyeing produced in the absence of the compound of the Formula 106.

*Example 23*

A mercerized cotton fabric is padded at 40° C. with a solution which contains per 1000 parts of water 30 parts of the dyestuff of the Formula 201 used in Example 10, 200 parts of urea, 20 parts of sodium carbonate and 5 parts of the compound of the Formula 106. Fixing is achieved by exposing the impregnated fabric to the action of a high-frequency electric field. The fabric is then rinsed in cold and in hot water, soaped at the boil, once more rinsed and dried.

The resulting, intense fast blue tint is of greater tinctorial strength than a comparable dyeing produced in the absence of the compound of the Formula 106.

*Example 24*

A cotton fabric is padded at 40° C. with a solution containing in 1000 parts of water 30 parts of the dyestuff of the formula (212) 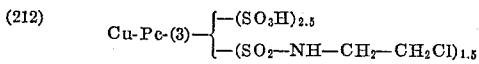

(where CuPc is the radical of copper phthalocyanine), 50 parts of urea, 20 parts of sodium carbonate and 3 parts of the compound of the Formula 110, then dried at 60 to 80° C. and steamed for 30 seconds. After steaming, the fabric is rinsed in cold and in hot water and soaped at the boil.

The resulting turquoise dyeing has good properties of fastness.

A dyeing produced in the identical manner except that the compound of the Formula 110 was omitted was substantially weaker.

Equally good results are obtained with the quaternary compound of the Formula 104 or 130.

*Example 25*

30 parts of the dyestuff of the formula (213) 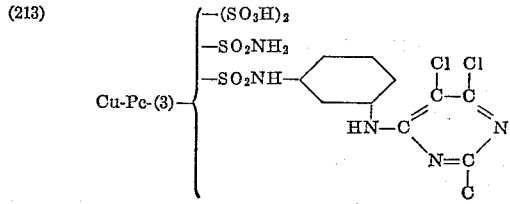

(where CuPc is the copper phthalocyanine radical) and 20 parts of the dyestuff of the formula (214) 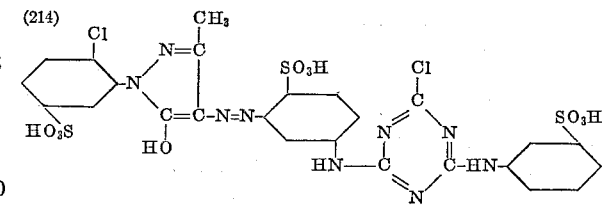

are dissolved together in 800 parts of boiling water, and the solution is cooled to 25° C. To this solution there are added 16 parts of trisodium phosphate, 8 parts by volume of sodium hydroxide solution of 30% strength and 5 parts of the compound of the Formula 105b, and the whole is made up with cold water to 1000 parts by volume.

A cotton fabric is padded with the above solution to a weight increase of 70%, then reeled and stored for 6 hours at a constant temperature of 25° C. After having been so stored the fabric is thoroughly rinsed in cold and in hot water and finally soaped at the boil.

A brilliant yellowish green tint is obtained. A comparable combination dyeing produced in the absence of the quaternary compound is of a weaker tint.

When the above dyestuffs are replaced by a combination of 30 parts of the dyestuff of the Formula 209 according to Example 20 and 20 parts of the dyestuff of the formula (215) 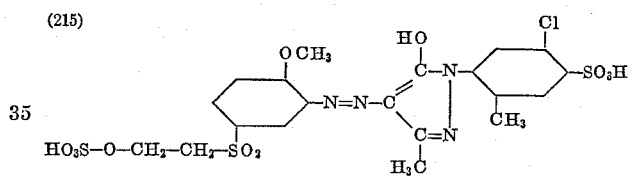

there results a similarly good orange tint.

*Example 26*

A printing paste is prepared which consists of 50 parts of the dyestuff of the Formula 212 of Example 24
200 parts of urea
320 parts of water
350 parts of sodium alginate thickening 50:1000
60 parts of aqueous potassium carbonate solution of 30% strength
10 parts of the compound of the Formula 106
10 parts of sodium meta-nitrobenzenesulfonate A cotton fabric is printed with this paste on a roller printing machine, dried, and the dyestuff is then fixed for 30 seconds in a rapid ager. The print is finished off as described in Example 10.

The resulting turquoise print has good properties of fastness and is of a substantially stronger tint than when the compound of the Formula 106 is omitted.

*Example 27*

A printing paste is prepared which contains 50 parts of the dyestuff of the formula (216) 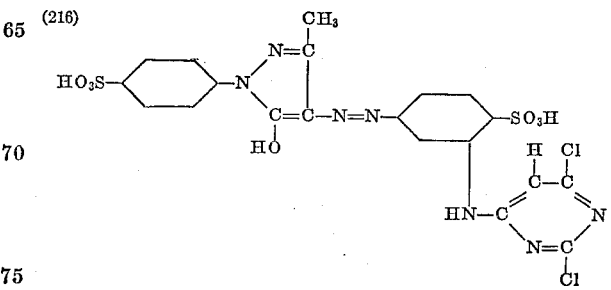

obtained by condensing the aminoazo dyestuff concerned with 2:4:6-trichloro-pyrimidine 100 parts of urea
420 parts of water
400 parts of sodium alginate thickening 50:1000
10 parts of the compound of the Formula 106
10 parts of sodium meta-nitrobenzenesulfonate
10 parts of sodium bicarbonate A cotton fabric is printed with this paste on a roller printing machine or by screen printing. The printed fabric is dried, fixed for 30 seconds in a rapid ager, and finished off as described in Example 10. The resulting yellow print is of greater tinctorial strength than when the compound of the Formula 106 is omitted.

Similar results are achieved when the compound of the Formula 106 is replaced by the compound of the Formula 130 or 131.

Example 28

A printing paste is prepared from 50 parts of the dyestuff of the Formula 212 of Example 24
420 parts of water
550 parts of sodium alginate thickening 50:1000

A cotton fabric is printed with this paste and then dried. The dried fabric is padded with a solution containing in 1000 parts of water, 150 parts of sodium chloride, 100 parts of potassium carbonate, 30 parts by volume of sodium hydroxide solution of 30% strength and 10 parts of the compound of the Formula 108, then squeezed to a weight increase of 70% and, without being intermediately dried, fixed for 30 seconds in a rapid ager and finished off as described in Example 10.

The resulting turquoise print is of a substantially greater tinctorial strength than when the above-mentioned quaternary compound is omitted.

A similar good result is obtained on spun rayon fabrics.

If desired, the quaternary compound of the Formula 108 may be incorporated with the printing paste.

Example 29

A printing paste is prepared which consists of: 20 parts of the 1:2-cobalt complex which contains per 1 atomic proportion of cobalt 2 molecules of the dyestuff of the formula

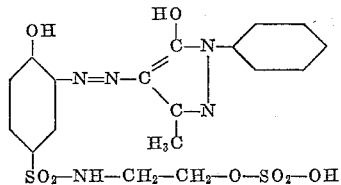

$SO_2$—NH—$CH_2$—$CH_2$—O—$SO_2$—OH 100 parts of urea
420 parts of water
350 parts of sodium alginate thickening 50:1000
50 parts of sodium bicarbonate
10 parts of the compound of the Formula 106
10 parts of sodium meta-nitrobenzenesulfonate A cotton fabric is printed with this paste on a roller printing machine and dried, then fixed for 30 seconds in a rapid ager and finished off as described in Example 10.

The resulting yellowish brown print is of greater tinctorial strength than when the compound of the Formula 106 is omitted.

Example 30

A cotton fabric is impregnated to a weight increase of 70% with a solution of 4 parts of the dyestuff of the Formula 203 used in Example 12 in 100 parts of water.

After an intermediate drying the fabric is conveyed through a solution of 250 parts of sodium chloride, 6 parts of sodium hydroxide (100% strength) and 5 parts of the compound of the Formula 123 in 900 parts of water. This bath is located over one leg of a U-shaped vessel containing a suitable low-melting alloy. The chemical bath and the metal bath have a temperature of 90° C. The fabric is conducted in such a manner that it passes first through the metal bath. The time of contact between the goods and the metal bath ranges from 7 to 10 seconds. On issuing from the metal bath the fabric is thoroughly rinsed in cold water and then for about 10 minutes in boiling water and finally dried.

The resulting strong violet tint displays good properties of fastness.

When the same procedure is adopted, except that the chemical bath is prepared without the compound of the Formula 123, a pale lilac tint results.

Example 31

100 parts of cotton fabric are immersed at 25° C. in a dyebath containing in 3000 parts of water 3 parts of the dyestuff of the Formula 202 shown in Example 11. In the course of 30 minutes there are added 150 parts of sodium chloride, then 25 parts of anhydrous sodium carbonate and after another 5 minutes 20 parts of the compound of the Formula 127. The fabric is left for another hour in the dyebath, then rinsed and soaped in the usual manner; a red tint is obtained.

When the compound of the Formula 127 is omitted, a substantially weaker tint results.

A similar good result is obtained when the 25 parts of sodium carbonate are replaced by 20 parts of a methanolic solution of 40% strength of trimethylbenzyl ammonium hydroxide.

Example 32

A printing paste is prepared from 50 parts of the dyestuff of the Formula 202 of Example 11
200 parts of urea
370 parts of water
350 parts of sodium alginate thickening 50:1000
10 parts of sodium bicarbonate
10 parts of the compound of the Formula 109
10 parts of sodium meta-nitrobenzenesulfonate A cotton fabric is printed with this paste on a roller printing machine, then dried, stored for 24 hours at 35 to 40° C. and finished off in known manner. A red print is obtained. When the quaternary compound is omitted, a substantially weaker tint is produced.

At a lower temperature (20 to 30° C.) a similar effect is achieved by storing for 2 to 3 days; at a higher temperature (60 to 80° C.) a comparable result is achieved within 30 to 60 minutes.

When the above-mentioned dyestuff is replaced by the dyestuff of the Formula 201 shown in Example 10, a similarly good result is obtained.

Example 33

A mercerized cotton fabric is padded at 30° C. with a liquor containing in 1000 parts of water 30 parts of the dyestuff of the formula (218)

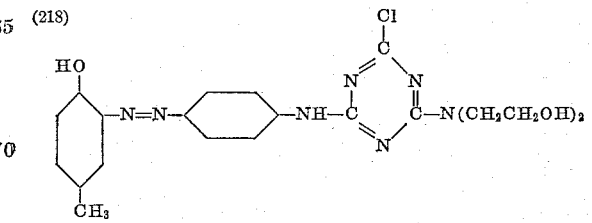

as well as 250 parts by volume of ethylene glycol monoethyl ether, 30 parts by volume of sodium hydroxide solution of 30% strength and 2 parts of the compound of the Formula 105b.

The impregnated fabric is reeled and stored at room temperature for 6 to 12 hours, then rinsed in cold and in hot water and finally soaped at the boil.

The resulting yellow dyeing is distinguished by good properties of fastness and is of a distinctly greater tinctorial strength than a comparable dyeing produced in the absence of the afore-mentioned quaternary compound of the Formula 105b.

When the compound of the Formula 105b is replaced by an equivalent proportion of the compound of the Formula 106, 112 or 125b, deeper tints are likewise obtained.

What is claimed is:

1. Process for coloring fibrous materials with a member selected from the group consisting of reactive dyestuffs and reactive dyestuff intermediates which process comprises applying as agent that promotes the reaction between said reactive members and the fibrous materials a quaternary nitrogen compound that has no dyestuff character and has the formula

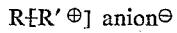

in which R represents the radical of a member selected from the group consisting of halogen pyrimidine, 1:3:5-triazine, halogen quinazoline and halogen pyridazine linked through one of its carbon ring members to the tertiary nitrogen atom of R' which itself represents the radical of a member selected from the group consisting of non-aromatic tertiary amines containing 3 to 6 carbon atoms for each tertiary amino group and non-aromatic tertiary hydrazines containing apart from the hydrazine >N—N< grouping only carbon and hydrogen atoms.

2. Process for coloring fibrous materials with reactive dyestuffs which comprises applying as agent that promotes the reaction between the reactive dyestuff and the fibrous material a quaternary nitrogen compound that has no dyestuff character and has the formula

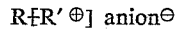

in which R represents the radical of a 1:3:5-triazine linked through a carbon ring member to the tertiary nitrogen atom of R' which itself represents a non-aromatic tertiary amine containing 3 to 6 carbon atoms for each tertiary amino group.

3. Process for coloring fibrous materials with reactive dyestuffs which comprises applying as agent that promotes the reaction between the reactive dyestuff and the fibrous material a quaternary nitrogen compound that has no dyestuff character and has the formula

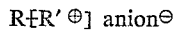

in which R represents the radical of a 1:3:5-triazine linked through a carbon ring member to the tertiary nitrogen atom of R' which itself represents a non-aromatic tertiary hydrazine containing apart from the hydrazine >N—N< grouping only carbon and hydrogen atoms.

4. Process for coloring fibrous materials with reactive dyestuff intermediates which comprises applying as agent that promotes the reaction between the reactive dyestuff intermediate and the fibrous material a quaternary nitrogen compound that has no dyestuff character and has the formula

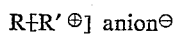

in which R represents the radical of a 1:3:5-triazine linked through a carbon ring member to the tertiary nitrogen atom of R' which itself represents a non-aromatic tertiary amine containing 3 to 6 carbon atoms for each tertiary amino group.

5. Process for coloring fibrous materials with reactive dyestuff intermediates which comprises applying as agent that promotes the reaction between the reactive dyestuff intermediate and the fibrous material a quaternary nitrogen compound that has no dyestuff character and has the formula

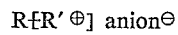

in which R represents the radical of a 1:3:5-triazine linked through a carbon ring member to the tertiary nitrogen atom of R' which itself represents a non-aromatic tertiary hydrazine containing apart from the hydrazine >N—N< grouping only carbon and hydrogen atoms.

6. A process for coloring fibrous materials with reactive dyestuffs which comprises applying as an agent that promotes the reaction between the reactive dyestuff and the fibrous materials the quaternary compound of the formula

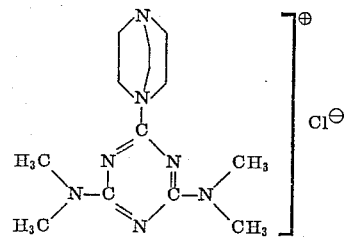

7. A process for coloring fibrous materials with reactive dyestuffs which comprises applying as an agent that promotes the reaction between the reactive dyestuff and the fibrous materials the quaternary compound of the formula

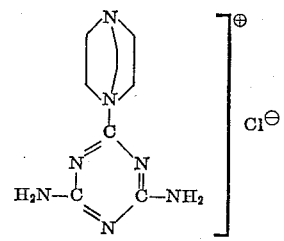

8. A process for coloring fibrous materials with reactive dyestuffs which comprises applying as an agent that promotes the reaction between the reactive dyestuff and the fibrous materials the quaternary compound of the formula

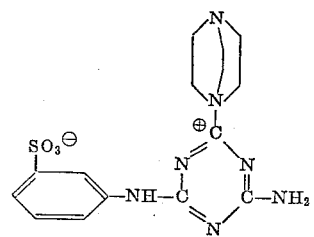

9. A process for coloring fibrous materials with reactive dyestuffs which comprises applying as an agent that promotes the reaction between the reactive dyestuff and the fibrous materials the quaternary compound of the formula

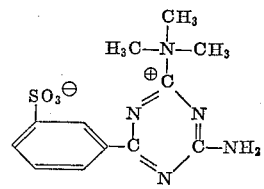

10. A process for coloring fibrous materials with reactive dyestuffs which comprises applying as an agent that promotes the reaction between the reactive dyestuff and the fibrous materials the quaternary compound of the formula

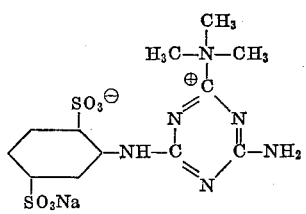

11. A process for coloring fibrous materials with reactive dyestuffs which comprises applying as an agent that promotes the reaction between the reactive dyestuff and the fibrous materials the quaternary compound of the formula

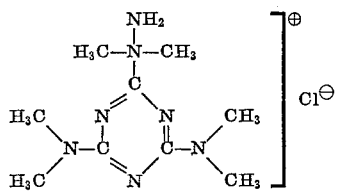

12. A process for coloring fibrous materials with reactive dyestuffs which comprises applying as an agent that promotes the reaction between the reactive dyestuff and the fibrous materials the quaternary compound of the formula

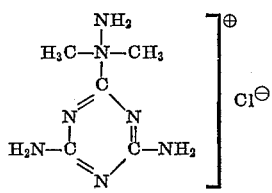

13. A process for coloring fibrous materials with reactive dyestuffs which comprises applying as an agent that promotes the reaction between the reactive dyestuff and the fibrous materials the quaternary compound of the formula

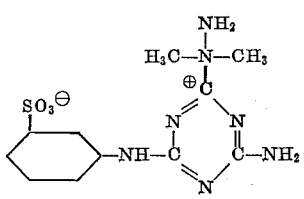

14. A process for coloring fibrous materials with reactive dyestuffs which comprises applying as an agent that promotes the reaction between the reactive dyestuff and the fibrous materials the quaternary compound of the formula

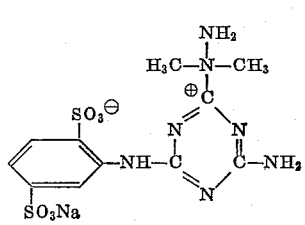

References Cited by the Examiner

UNITED STATES PATENTS

| | | | |
|---|---|---|---|
| 2,232,892 | 2/41 | Von Klenck | 8—1 |
| 2,725,379 | 11/55 | Bernstein et al. | 260—249.6 |
| 2,767,180 | 10/56 | Winthrop et al. | 260—249.6 |
| 3,042,475 | 7/62 | Heslop et al. | 8—1 |

FOREIGN PATENTS

| | | |
|---|---|---|
| 174,377 | 3/53 | Austria. |
| 888,699 | 9/53 | Germany. |

NORMAN G. TORCHIN, *Primary Examiner.*

IRVIN MARCUS, A. LOUIS MONACELL, *Examiners.*